United States Patent Office 3,672,837
Patented June 27, 1972

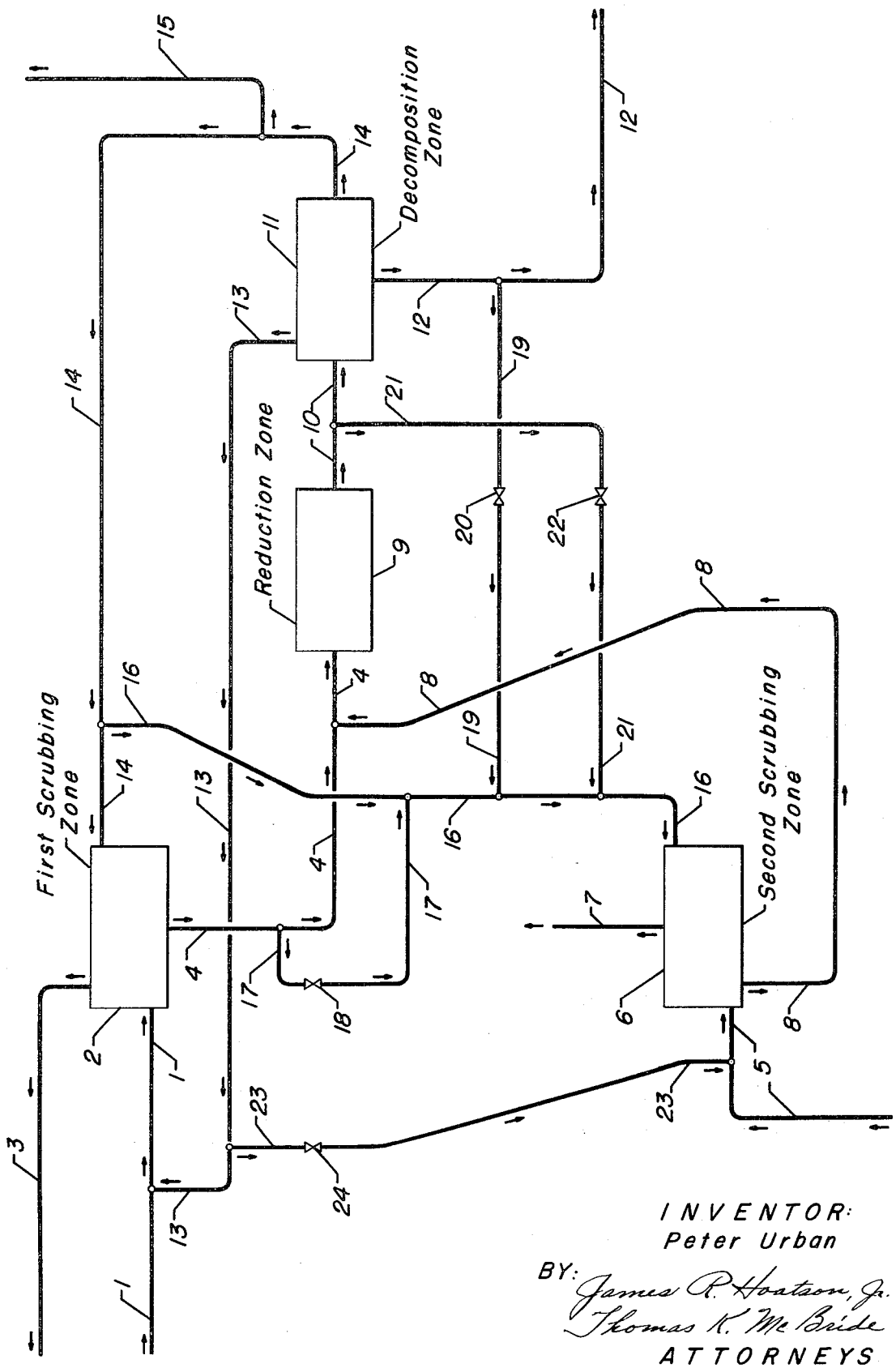

3,672,837
PROCESS FOR TREATING TWO GAS STREAMS
Peter Urban, Northbrook, Ill., assignor to Universal Oil
Products Company, Des Plaines, Ill.
Filed Oct. 1, 1970, Ser. No. 77,082
Int. Cl. C01b 17/14
U.S. Cl. 23—225                                14 Claims

ABSTRACT OF THE DISCLOSURE

A first gas stream containing $H_2S$ and a second gas stream containing $SO_2$ are simultaneously treated in order to remove $SO_2$ and $H_2S$ from the respective streams and to produce elemental sulfur by the steps of: (a) scrubbing the first gas stream with an aqueous scrubbing solution to produce an effluent stream containing a water-soluble sulfide compound; (b) contacting the second gas stream with an aqueous scrubbing solution and with a reducing agent at reaction conditions selected to result in an effluent stream containing a water-soluble thiosulfate compound; (c) subjecting a mixture of the effluent streams from step (a) and (b) to reduction conditions selected to result in an effluent stream containing a polysulfide compound; (d) decomposing the resulting polysulfide compound to form elemental sulfur, hydrogen sulfide, and a regenerated scrubbing solution; (e) passing the resulting hydrogen sulfide to step (a); and (f) recirculating the regenerated scrubbing solution to steps (a) and (b).

The subject of the present invention is a continuous, closed loop process for treating two gas streams, one containing $SO_2$ and the other containing $H_2S$, in order to purify same and to produce elemental sulfur. The present invention, more specifically, involves a combination process wherein a first gas stream containing $H_2S$ is scrubbed with an aqueous absorbent solution containing an alkaline reagent in order to remove $H_2S$ from same and wherein a second gas stream containing $SO_2$ is scrubbed with a similar type of absorbent solution and simultaneously reacted with a reducing agent which is effective to convert absorbed $SO_2$ to the corresponding thiosulfate compound. The resulting rich absorbent solutions recovered from the two scrubbing steps are then commingled and subjected to reduction conditions effecting the formulation of polysulfide. Subsequently, the polysulfide is decomposed to yield elemental sulfur, hydrogen sulfide and a regenerated absorbent solution. The hydrogen sulfide is then charged to the $H_2S$-scrubbing step, and the regenerated absorbent solution is recirculated to the scrubbing steps.

In many areas of modern industry, situations are commonly encountered in which two types of gas streams containing sulfur contaminants must be treated within the same chemical, petrochemical or petroleum refining plant or in close proximity to each other. One type of gas stream contains $H_2S$ as a contaminant and the other contains $SO_2$ as a contaminant. Gas streams containing $H_2S$ are quite commonly available in many areas of industry. One example is the natural gas industry where the $H_2S$ content of certain gas streams recovered from natural deposits or wells in many areas of the world is often too high for optimum commercial acceptance. Another example of a commonly available $H_2S$ containing gas stream is associated with the coke-making industry where coal gas containing unacceptable amounts of $H_2S$ is commonly produced by the destructive distillation of bituminous coal having a high sulfur content. Yet another example is found in the manufacture of water gas or synthesis gas where it is not unusual to produce gas streams containing substantial amounts of $H_2S$ by passing steam over a bed of incandescent coke containing minor amounts of sulfur. More frequently, this first type of gas stream is encountered in the petroleum refining industry because the principal raw material used, crude oil, typically contains a minor amount of sulfur, principally in the form of organic sulfur compounds. During the course of the many processes to which the crude oil or fractions thereof are subjected, one or more gas streams containing $H_2S$ are quite commonly produced by the cleavage of carbon-sulfur bonds in the presence of hydrogen at relatively high temperatures. This reaction generally occurs in many hydrocarbon conversion processes used in the typical petroleum refinery such as hydrocracking, hydrodesulfurization, catalytic reforming, thermal cracking, catalytic cracking, hydrorefining and the like processes. Similarly, the second type of gas stream, those containing $SO_2$, are widely available as side products of many significant industrial activities. One of the more common sources for an $SO_2$-containing gas stream is associated with the combustion of sulfur-containing fuels in internal combustion engines, heating units, steam boilers, and the like conversion units to produce flue or stack gas streams containing significant amounts of sulfur dioxide. Similar gas streams containing $SO_2$ are, moreover, generally produced in many widely used industrial processes such as in the smelting of sulfur-bearing ores, the synthesis of sulfuric acid, the sulfonation of hydrocarbons, the production of coke, the production of elemental sulfur in a Claus-type process, the production of paper via a wood-pulping process and the like industrial processes. In short, it is clear that these two types of gas streams are widely available in modern industry and are quite commonly available in close proximity to each other. For example, in the crude oil refining industry, $SO_2$-containing gas streams are produced during the regeneration of catalysts, during the production of heat and utilities for the operation of the various units and during various oxidation procedures which are performed on various hydrocarbon streams containing sulfur. On the other hand, hydrogen sulfide-containing streams are typically produced as side or drag streams in such elemental processes as hydrorefining and the like processes. In the past, treatment of these two types of streams to remove their respective sulfur contaminants therefrom has often been viewed as separate and distinct problems. Because of the growing public awareness of the serious pollution problems that can be caused by the indiscriminate discharge of these sulfur contaminated gas streams, there is a need for a treating system that can simultaneously treat both of these types of gas streams in a convenient and simple manner.

Accordingly, the problem addressed by the present invention is the simultaneous treatment of these two types of gas streams in order to remove the sulfur contaminants from both of them in a highly efficient and economical manner. Another aspect of the problem is to treat these two types of streams without commingling them in order to prevent contamination of one or both of these gas streams with undesired components from the other stream. Yet another aspect of the problem is that it is desired to recover the sulfur contaminants in the form of elemental sulfur because it finds a ready market. An attendant problem is to provide a procedure for treating these two streams in a continuous closed-loop process with respect to the absorbent solution. In addition, the amount of undesired intractable sulfate by-products formed in the process should be held to minimum levels.

I have now found a convenient and simple process for simultaneously treating these two gas streams with suppression of undesired sulfate by-products and with production of elemental sulfur. In essence, my process involves a series of interdependent and interconnected steps including: a first scrubbing step which operates on the H₂S-containing gas stream to produce an effluent water stream containing a sulfide compound, a second scrubbing step which operates on the SO₂-containing gas stream to provide an effluent stream containing a thiosulfate compound, a reduction step which reacts these two effluent streams to produce another effluent stream which contains a polysulfide compound and a polysulfide decomposition step which decomposes the resulting polysulfide to form elemental sulfur, hydrogen sulfide and a regenerated absorbent solution. At least a portion of the resulting hydrogen sulfide from the decomposition step is then passed to the H₂S-scrubbing step, and the regenerated absorbent solution is recirculated to both scrubbing steps. At the heart of my procedure is the idea of using a reducing agent in the SO₂-scrubbing step in order to form thiosulfate therein. The availability of thiosulfate as one of the products from the scrubbing steps then allows the reduction step to be a simple thermal reaction wherein sulfide is reacted with thiosulfate to produce a polysulfide compound in a highly efficient and selective manner. In addition, I have discerned that the hydrogen sulfide that is produced by decomposing the polysulfide product of the reduction step can be efficiently recovered by passing same to the H₂S-scrubbing step. Some of the advantages associated with my procedure are as follows: (1) elemental sulfur is selectively produced with corresponding minimization of undesired, interactable sulfate by-products; (2) easily handled aqueous solutions are used to remove both the H₂S and the SO₂; (3) absorbent solution is used in a closed-loop manner; (4) no catalyst is needed in the regeneration step which obviously obviates any problems or deactivation or regeneration of catalysts which might otherwise occur; (5) regeneration step is operated at relatively mild conditions which minimizes utility costs; (6) reducing agent used in the SO₂-scrubbing step can be selected from a number of internal sources within the process; (7) requirements for make-up alkaline reagent and water are minimized; and (8) H₂S-scrubbing step is used for two purposes—one involving the scrubbing of the input H₂S-containing gas stream and the other involving the recovery of the by-products of the polysulfide decomposition step.

It is, accordingly, a principal object of the present invention to provide a continuous, closed-loop process for the simultaneous scrubbing of a first gas stream containing H₂S and a second gas stream containing SO₂ in order to purify both of these streams and to produce elemental sulfur. Another object is to minimize the amount of alkaline reagent consumed in the formation of undesired, interactable sulfate by-products in such a scrubbing process. Yet another object is to provide a process for scrubbing these two different kinds of contaminated gas streams which can operate with continuous regeneration of the rich scrubbing solutions, recovered from the scrubbing steps so that a closed-loop operation with respect to the scrubbing solution is achieved. Still another object is to provide a combination process for scrubbing two gas streams, one containing SO₂ and the other containing H₂S, which is relatively simple, effective and economical.

In brief summary, the present invention is, in one embodiment, a process for simultaneously treating a first stream containing H₂S and a second gas stream containing SO₂ in order to remove SO₂ and H₂S from the respective stream and to produce elemental sulfur. In the first step of the process the gas stream containing H₂S is contacted with an aqueous absorbent solution containing an alkaline reagent at scrubbing conditions selected to result in a first treated gas stream containing a reduced amount of H₂S and an effluent water stream containing a water-soluble sulfide compound. The second gas stream is contacted, in the second step, with an aqueous absorbent solution containing an alkaline reagent and with a reducing agent selected from the group consisting of finely divided sulfur, a polysulfide compound, a water-soluble sulfide compound and mixtures thereof. This second step is performed at reaction conditions selected to result in a second treated gas stream containing a reduced amount of SO₂ and an effluent water stream containing a water-soluble thiosulfate compound. A mixture of the effluent water streams from the first step and the second step is, in the next step, subjected to reduction conditions selected to result in an effluent stream containing a polysulfide compound. The resulting effluent stream containing a polysulfide compound is then subjected to polysulfide decomposition conditions effective to form elemental sulfur, hydrogen sulfide and a regenerated absorbent solution. In the final steps, at least a portion of the resulting hydrogen sulfide from the decomposition step is passed to the H₂S-scrubbing step, and separate portions of the regenerated absorbent solution are recirculated to the scrubbing steps.

In a second embodiment, the present invention is a process as outlined above in the first embodiment with the exception that the aqueous absorbent solutions contains ammonium hydroxide. Consequently, the effluent water stream recovered from the first step contains ammonium hydrosulfide; the effluent water stream from the second step contains ammonium thiosulfate; and the effluent stream recovered from the third step contains ammonium polysulfide.

In another embodiment, the current invention is essentially a process as outlined above in the first embodiment wherein the reaction conditions utilized in the SO₂-scrubbing step include a temperature of about 20 to about 150° and a pressure sufficient to maintain the aqueous absorbent solution in the liquid phase, and wherein the reduction conditions utilized in the polysulfide formation step include a temperature of about 100 to about 370° C. and a pressure sufficient to maintain the mixture of the effluent water streams from the scrubbing steps in the liquid phase.

Other embodiments relate to particularly preferred sources for the reducing agent utilized in the SO₂-scrubbing step. For example, one preferred source is a portion of the elemental sulfur recovered from the polysulfide decomposition step. Another source is a portion of the polysulfide-containing effluent stream produced in the reduction step. Yet another source is a portion of the effluent stream recovered from the H₂S-scrubbing step. And still another preferred source for the reducing agent is a portion of the hydrogen sulfide produced in the polysulfide-decomposition step.

Other embodiments and objects of the present invention include additional details about particular input streams, output streams, conditions and mechanics associated with each of the essential and preferred steps thereof. These are hereinafter disclosed in the following detailed discussion of the essential and preferred step of the present invention.

The scrubbing solution used in the instant process is generally characterized as an aqueous absorbent solution containing a suitable alkaline reagent. Included within the scope of the phrase "alkaline reagent" are common alkaline reagents such as ammonium hydroxide, the alkali metal hydroxides, the water-soluble alkaline earth hydroxides, and salts of weak acids such as ammonium carbonate, the alkali metal carbonates, and the alkaline earth carbonates. In addition, salts of weak organic acids may be used such as the ammonium, alkali metal or alkaline earth metal salts of common carboxylic acids. Of the alkali metal reagents, sodium hydroxide, sodium carbonate, potassium hydroxide and potassium carbonate are particularly preferred. In most cases, excellent results are obtained when the alkaline reagent is ammonium hydroxide or ammonium carbonate. It is to be noted that the scope of the present invention includes the use of mixtures of common alkaline reagents such as the ones previously mentioned. Moreover, it is within purview of the present invention to use, as the alkaline reagent, mixtures of normal and acid salts of common alkaline reagents such as a mixture of a bicarbonate salt and a normal carbonate salt of ammonia, the alkali metals and the alkaline earth metals. The amount of alkaline reagent contained in the aqueous absorbent solution is not critical and can be selected from a relatively broad range. In general, acceptable results are obtained with an aqueous absorbent solution containing about 1 to about 30 wt. percent of the alkaline reagent, although solutions containing an amount of the alkaline reagent up to the solubility limit of the particular reagent at the conditions maintained in the scrubbing steps can be used if desired.

The input gas stream containing $H_2S$ which is charged to the $H_2S$ scrubbing step may be derived from a number of different sources and may, for example, be a coal gas, an oil gas, a water gas, a natural gas or a refinery gas stream. In order to avoid confusion, some of the various types of gas streams which can be charged to this step are defined as follows: (1) a coal gas is a mixture of gases produced by the destructive distillation of coal; (2) an oil gas is a gas derived from petroleum by the reaction of oil vapors and steam at high temperatures; (3) a water gas or a synthesis gas is a gas made by decomposing steam by passing it over a bed of incandescent coke or coal and in other cases it is made by the high temperature reduction of steam with low molecular weight hydrocarbons; (4) a natural gas is a mixture of low molecular weight, naturally gaseous hydrocarbons-typically containing $C_1$ to $C_4$ hydrocarbons; and (5) a refinery gas is a mixture of normally gaseous low molecular wt. hydrocarbons, typically present with hydrogen, which is produced in converting and distilling hydrocarbons. The gas stream charged to this step will contain $H_2S$ in an amount ranging from about 0.01 vol. percent up to about 50 vol. percent or more. Typically the amount of $H_2S$ contained in this gas stream will be about 1 to about 15 vol. percent. It is to be noted that it is a feature of the present process that a portion of this first gas stream is derived from the subsequently described polysulfide-decomposition step.

The conditions utilized in this $H_2S$-scrubbing step are conventional conditions and generally comprises relatively low temperatures and relatively high pressures. Typically, good results are obtained at a temperature of 50° F. to about 150° F. and a pressure ranging from about 1 to about 500 atmospheres. For example, excellent results are obtained at a pressure of about 70° F. and a pressure of about 10 atmospheres. Another significant parameter involved in the operation of this scrubbing step is the ratio of the volume of $H_2S$-containing gas charged to this step to the amount of aqueous absorbent solution circulated therethrough. Ordinarily, the selection of a particular value of this parameter is a function of the initial $H_2S$ content of the gas stream, the proportion of $H_2S$ which is to be removed from this gas stream in the scrubbing step, the specific loading capacity of the absorbent selected, the efficiency of the absorption tower and the particular temperature and pressure selected for use in this step. Considering all of these factors, this ratio is ordinarily selected from the rather broad range corresponding to about 100:1 to about 10,000:1.

In the $SO_2$-scrubbing step, the input gas stream containing $SO_2$ is intimately contacted with another portion of the aqueous absorbent solution and with a suitable reducing agent as is hereinafter explained. The input gas stream passed to this step is typically a flue or stack gas. For example a typical stack gas contains about 1 to about 10% $O_2$, about 5 to about 15% or more $CO_2$, about 3 to 10% or more $H_2O$, about 0.05 to 5% or more $SO_2$ and relatively large amounts of $N_2$. In some cases the input gas stream to this step also contains carbon monoxide and oxides of nitrogen. On an over-all basis, it is necessary for the proper operation of the present process that the amount of $SO_2$ charge to the present process be approximately one half of the net amount of $H_2S$ which is extracted from the first gas stream in the $H_2S$-scrubbing step. That is, on an over-all basis, it is necessary that ½ moles of $SO_2$ be supplied as an input to the present process for every mole of $H_2S$ which is charged thereto. Consequently, when insufficient $SO_2$ is available, it is within the scope of the present invention to generate the required amount of $SO_2$ by burning a portion of the sulfur product obtained from the subsequently described polysulfide-decomposition step. Likewise, when insufficient $H_2S$ is available to the present process, it can be generated by any method known to those skilled in the art; for example, it can be generated from the sulfur product of the present invention by any of the techniques known in the art for reacting sulfur vapor with hydrogen, hydrocarbons or steam to produce $H_2S$. Of course, in many cases, the operation of the scrubbing steps can be easily adjusted so that the amount of $H_2S$ and $SO_2$ extracted from the two gas streams is in the proper proportion.

Both of these scrubbing steps can be carried out in conventional scrubbing zones in any suitable manner including multiple stages. The scrubbing solution can be passed into the scrubbing zone in either upward or downward flow and the input gas stream can be simultaneously introduced into the scrubbing zone in concurrent flow relative to the scrubbing solution. A particularly preferred procedure involves downward flow of the scrubbing solution with countercurrent flow of the gas stream which is to be treated. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich scrubbing solution is withdrawn from the lower region thereof.

The $SO_2$-scrubbing step is generally conducted under conventional scrubbing conditions which are selected on the basis of the characteristics of the specific alkaline reagent utilized, the sulfur dioxide content of the input gas stream, the portion of the sulfur dioxide that is to be removed in the scrubbing step, and the physical properties of the scrubbing zone. Ordinarily, the $SO_2$-scrubbing step is operated at a relatively low temperature of about 20 to 150° C., a relatively low pressure which typically approximates atmospheric, and a volume ratio of input gas stream to scrubbing solution of about 100:1 to about 10,000:1. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

In accordance with the present invention, the operation of the $SO_2$-scrubbing step is modified by the introduction into the scrubbing zone of a reducing agent selected from the group consisting of finely divided sulfur, a polysulfide compound, a water-soluble sulfide compound and mixtures thereof. In one mode of operation of the $SO_2$-scrubbing step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into the scrubbing step via a water stream containing a slurry of finely divided sulfur in an amount of about 1 to about 75 wt. percent thereof, although any other suitable means for injecting finely divided solid particles can be utilized if desired. One preferred procedure involves the addition of the required amount of sulfur to the scrubbing solution before it enters the scrubbing zone. In this first mode of operation, it is preferred to also introduce a wetting agent into the scrubbing zone in order to facilitate good contact of the elemental sulfur with the absorbed $SO_2$. Suitable wetting agents are: the salts of the alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the absorbed $SO_2$ that is reacted. The amount of elemental sulfur utilized in this first mode of operation of the $SO_2$-scrubbing step should be sufficient to at least supply one atom of sulfur per molecule of the absorbed $SO_2$, with the preferred amounts corresponding to about 1 to about 3 atoms of sulfur per mole of absorbed $SO_2$. A preferred source for the elemental sulfur in this mode of operation is a portion of the sulfur product of the polysulfide-decomposition step.

In a second mode of operation of this $SO_2$-scrubbing step, the reducing agent is a polysulfide compound. Suitable polysulfide compounds include the ammonium, alkali metal, and alkaline earth polysulfides. Best results are ordinarily obtained with ammonium polysulfide. The polysulfide compound is ordinarily charged to the scrubbing step in the form of an aqueous solution containing about 1 to about 50 wt. percent of the polysulfide compound. In fact, a preferred procedure involves the addition of the polysulfide compound to the scrubbing solution before it enters the scrubbing zone. It is to be noted that when the reducing agent is a polysulfide compound, no wetting agent is necessary in order to achieve good contact with the sulfite compound. The amount of the polysulfide compound charged to the $SO_2$-scrubbing step in this mode of operation is preferably sufficient to provide at least the stoichiometric amount necessary for the reaction between it and the absorbed $SO_2$ to produce the corresponding thiosulfate compound. In the typical case where the polysulfide compound contains four atoms of elemental sulfur and one atom of sulfide (e.g. $(NH_4)_2S_5$), the stoichiometric amount is 1/8 mole of polysulfide per mole of absorbed $SO_2$ with a preferred value being about 1/4 to about 3/4 or more moles of polysulfide per mole of absorbed $SO_2$. A preferred source for the polysulfide reducing agent in this mode of operation is a portion of the effluent stream from the hereinafter described reduction step.

In a third mode of operation of this $SO_2$-scrubbing step, the reducing agent is a water-soluble sulfide compound. Suitable water-soluble sulfide compounds are hydrogen sulfide, ammonium sulfide, ammonium hydrosulfide and the sulfides and hydrosulfide salts of the alkali and alkaline earth metals. This water-soluble sulfide compound is preferably introduced into the scrubbing zone by adding it to the scrubbing solution before it enters the zone. Best results are ordinarily obtained in this last mode of operation of this step when the sulfide reactant is hydrogen sulfide or ammonium hydrosulfide. The amount of this sulfide reactant charged to the scrubbing step in this mode of operation is at least sufficient to provide 0.5 mole of sulfide compound per mole of absorbed $SO_2$, with best results obtained at a mole ratio corresponding to about 0.6 to about 1.5 or more. Likewise, in this third mode of operation, best results are ordinarily obtained when the pH of the scrubbing solution withdrawn from this step is in the range of 4 to about 7. Preferred sources for the reducing agent in this mode are a portion of the effluent stream from the $H_2S$ scrubbing step or a portion of the overhead stream from the polysulfide decomposition step.

Conditions utilized in this $SO_2$-scrubbing step are generally described as reaction conditions effective to form thiosulfate and comprise a temperature of about 20 to about 150° C., a pressure sufficient to maintain the scrubbing solution in the liquid phase and a contact time corresponding to about 0.05 to 1 or more hours. In general the contact time necessary for the desired reaction is a function of the reducing agent utilized with relatively short contact times of about 1 to 5 minutes being sufficient in the case where the reducing agent is a polysulfide compound. The other two types of reducing agents require a relatively longer contact time ranging up to about 0.5 to about 1 hour. Considering all of the factors involved in the operation of this $SO_2$-scrubbing step, best results are ordinarily obtained when the reducing agent is a polysulfide compound, and particularly ammonium polysulfide, or a sulfide compound such as hydrogen sulfide or ammonium hydrosulfide. It is to be noted that the amount of undesired sulfate compounds formed in this $SO_2$-scrubbing step will be substantially less than that formed when this step is operated without the reducing agent—typically the reduction is by a factor of at least 2.

Following the $H_2S$ and $SO_2$-scrubbing steps, the effluent streams produced therein are commingled and the resulting mixture passed to the principal reduction step of the present invention. Best results are ordinarily obtained in this reduction step when the amounts of these two effluent streams are carefully adjusted so that the mole ratio of sulfide to thiosulfide in the reduction step is selected from the range corresponding to about 2:1 to about 20:1, with the economical optimum range being about 2:1 to about 10:1. In general, it is preferred to operate this reduction step with relatively large amounts of sulfide reactant relative to the amount of thiosulfate reactant in order to insure a high conversion of the thiosulfate compound. For example, excellent results have been obtained at sulfide to thiosulfate mole ratios of 2.4:1, 3.8:1 and 7.5:1. The conditions utilized in this reduction step are generally characterized as reduction conditions, which are relatively more severe than the conditions utilized in the $SO_2$-scrubbing step. The conditions are selected to result in the formation of polysulfide and generally comprise: a temperature of about 100 to about 370° C., with best results obtained at a temperature of about 125 to about 250° C., a pressure sufficient to maintain a liquid phase condition in this reduction step and generally a pressure selected from the range of about 100 to about 5,000 p.s.i.g. is sufficient; a contact time of about 0.1 to about 1 hr.; and a pH of about 7 to about 12, with the preferred form being a pH of about 9 to 11. Excellent results are obtained in this step when the water-soluble sulfide reactant is ammonium hydrosulfide and the water-soluble thiosulfate compound is ammonium thiosulfate at a temperature of 200° C. a pressure of 250 p.s.i.g., a contact time of 6 minutes and a pH of 10.

After this reduction step, a polysulfide-containing aqueous effluent stream is withdrawn therefrom and at least a portion of it subjected to a polysulfide decomposition step. As previously explained, in one embodiment of the present process, a portion of this stream is passed to the $SO_2$-scrubbing step. Any suitable procedure known to the art for decompositing a polysulfide compound can be utilized in this step. One acceptable procedure involves the addition of an acidic material such as carbon dioxide to this effluent stream in an amount sufficient to lower the pH of the solution to a value below 7. Another method involves heating the effluent to a critical temperature in a closed vessel as is shown in U.S. Pat. No. 1,783,725. A preferred procedure for use in this step involves subjecting the polysulfide-containing effluent stream to thermal decomposition conditions effective to produce an overhead stream containing hydrogen sulfide and water and a bottoms stream containing alkaline reagent and elemental sulfur. Suitable polysulfide decomposition conditions include a temperature of about 100 to 200° C. and a pressure of about 1 to about 75 p.s.i.g. In the case where ammonium hydroxide is utilized as the alkaline reagent, it is necessary to operate the polysulfide-decomposition step so that a relatively low temperature is maintained at the top of the decomposition zone. Ordinarily this objective is conventionally accomplished by using a portion of the bottom water stream from the zone to cool the top of the column and to prevent $NH_3$ carry-over. Excellent results have been obtained in the decomposition of ammonium polysulfide by taking 20 vol. percent of the polysulfide-containing effluent stream overhead at a temperature of 140° C. and a pressure of 40 p.s.i.g. Generally, this step can be conducted in a distillation zone wherein $H_2S$ is stripped from the polysulfide-containing solution with the aid of a suitable upflowing gas stream such as steam, nitrogen, air and carbon dioxide which is typically injected into the bottom of the distillation zone. Of course, upflowing vapors can be generated in the distillation zone by supplying heat to the bottom of same by means such as a steam coil or a conventional reboiler. When the temperature utilized in the bottom of the distillation zone is less than the melting point of sulfur, the elemental sulfur produced in this step will be present in the form of a slurry of solid particles in the aqueous bottom stream withdrawn therefrom. This sulfur-containing aqueous stream can be subjected to any of the techniques known in the art for removing a solid from a liquid such as filtration, settling, centrifuging and the like operation to remove sulfur therefrom and to form a regenerated aqueous absorbent solution. On the other hand, when the decomposition temperature utilized in this step is greater than the melting point of sulfur, the bottom stream from the distillation column can be a mixture of liquid sulfur in an aqueous stream. This mixture can then be passed to a settling zone wherein the liquid sulfur can be allowed to settle and form a separate sulfur phase. In this last case, the separation of liquid sulfur from the regenerated aqueous absorbent solution can be performed, if desired, in the lower region of the distillation column by allowing a liquid sulfur phase to collect at the bottom of the zone and separately drawing it off as a bottom stream. The regenerated aqueous absorbent stream is then drawn off as a side stream.

From this decomposition step, there is obtained an overhead vapor stream containing $H_2S$, a sulfur product stream and a stream of regenerated aqueous absorbent solution. In accordance with the present invention at least a portion of the $H_2S$-containing overhead stream is passed to the $H_2S$-scrubbing step wherein it is reabsorbed and recirculated through the process. In one mode of operation of the $SO_2$-scrubbing step, a portion of this $H_2S$ containing vapor stream will be passed to the $SO_2$-scrubbing step in order to supply at least a portion of the necessary reducing agent thereto. Similarly, the regenerated absorbent solution is divided into two separate portions which are then recirculated to the $H_2S$- and $SO_2$-scrubbing steps. In some cases, a drag stream may be withdrawn from this regenerated absorbent stream in order to remove the net water produced in the reduction reaction; however, in many cases water will be lost from the system in the treated gas stream because they very rarely will be saturated with water when they are passed to the scrubbing steps. In this latter case, it may be necessary to add a minor amount of water to the regenerated absorbent solution in order to compensate for any net losses in the scrubbing steps. Because the selectivity for polysulfide in the reduction step is quite good, the amount of undesired sulfate by-products which will be present in this regenerated absorbent stream will be quite small. Typically, the amount of sulfate formed in the $SO_2$-scrubbing step and in the reduction step will be less than 5% of the total sulfur product from the system and more typically less than 1%. Even though this amount of undesired sulfate by-product is quite small, at some point in time, it will build up in the recirculating absorbent solution to the point where it must be removed by any of the conventional techniques known in the art such as crystallization, precipitation by adding a suitable reagent such as calcium oxide or by withdrawing and discarding a suitable drag stream.

Having broadly characterized the essential steps comprising the instant process, reference is now made to the attached drawing for a detailed explanation of a working example of a preferred embodiment of the present invention. The attached drawing is merely intended to be a general representation of the flow scheme employed with no intent to give details about heating means, cooling means, pumps, compressors, valves and control equipment except where a knowledge of these devices is essential to an understanding of the present invention or would not be self-evident to one of ordinary skill in the gas-treating art.

Referring now to the attached drawing, a gas stream containing $H_2S$ enters the process through line 1 and is commingled at the juncture of lines 13 and 1 with a $H_2S$-rich overhead stream obtained from zone 11 and will be explained hereinafter. The resulting mixture is then charged to the lower region of first scrubbing zone 2. Because it is necessary to operate reduction zone 9 with a substantial excess of sulfide reactant, ordinarily the amount of $H_2S$ introduced into the system via line 1 will be approximately 10 to 25% of the total amount charged to zone 2. Zone 2 is a vertically positioned tower containing suitable means for effecting intimate contact between an ascending gas stream and a descending liquid stream. Suitable contacting means are perforated plates, baffles, packing materials such as Raschig rings and the like means. Also introduced into the upper region of zone 2 via line 14 is an aqueous absorbent solution containing ammonium hydroxide. The amount of alkaline reagent contained in the aqueous absorbent stream is about 10 wt. percent thereof. In general it is necessary to inject sufficient $NH_3$ via line 14 to provide at least 1 mole of $NH_3$ per mole of $H_2S$ entering zone 2 via line 1, and more preferably about 1 to about 5 or more moles of $NH_3$ per mole of $H_2S$. The amount of $H_2S$ contained in the combined gas stream entering the lower region of zone 2 via line 1 is about 8 vol. percent. The rate of circulation of the aqueous absorbent solution relative to the rate at which the gas stream is injected into zone 2 is selected to produce an effluent liquid stream containing approximately 7.5 wt. percent sulfur in the form of ammonium hydrosulfide. This aqueous effluent stream is withdrawn from zone 2 via line 4 and passed to reduction zone 9. A treated gas stream is also withdrawn from the upper region of zone 2 via line 3 and is found to contain substantially less $H_2S$ than the input gas stream. Zone 2 is operated at a relatively low temperature and a relatively high pressure. Typically excellent results are obtained at a temperature of about 70° F. and a pressure of about 10 atmospheres.

Turning now to the $SO_2$-containing gas stream, it enters the system via line 5 and is passed into the lower region of the second scrubbing zone 6. This $SO_2$-containing gas stream is a flue gas stream obtained from the combustion of a sulfur-containing coal at an elevated temperature. The flue gas contains 5% $O_2$, 12% $CO_2$, 6% $H_2O$, 75% $N_2$ and 2% $SO_2$. Also charged to zone 6 is an aqueous absorbent solution containing about 10 wt. percent ammonium hydroxide, it enters the upper region of zone 6 via line 16.

The second scrubbing zone is an ordinary gas-liquid contacting zone quite similar to zone 2. It contains conventional means for effecting intimate contact between the ascending gas stream and a descending liquid stream.

An essential feature of the present invention is that a reducing agent is also introduced into zone 6 in an amount calculated to react with the absorbed $SO_2$ to produce thiosulfate. This reducing agent can be obtained from a number of different sources within the current process. For example, one source is a portion of the $H_2S$-containing overhead vapor stream obtained from decomposition zone 11. It is charged to zone 6 via lines 13, 23 and 5 when valve 24 is in the open position and valves 18, 20 and 22 are in the closed position. Another source for the reducing agent is a portion of the ammonium hydrosulfide-containing effluent stream withdrawn from zone 2 via line 4. In the case illustrated in the drawing, it is passed to zone 6 via lines 4, 17 and 16 when valve 18 is in the open position and valves 24, 22 and 20 are in the closed position. Still another source of the reducing agent for use in zone 6 is a portion of the sulfur product produced in decomposition zone 11. It is charged to zone 6 via lines 12, 19 and 16 when valve 20 is in the open position and valves 24, 18 and 22 are closed. The final source for the reducing agent within the disclosed process is a portion of polysulfide-containing effluent stream produced in zone 9. It is charged to zone 6 via lines 10, 21 and 16 when valve 22 is in the open position and valves 24, 18 and 20 are in the closed position. Of course, mixtures of these reducing agents may be used if desired. Regardless of the source of the necessary reducing agent, it is charged to zone 6 in an amount which is sufficient to react with the absorbed $SO_2$ to form ammonium thiosulfate. For example, when the reducing agent is hydrogen sulfide or ammonium hydrosulfide, it will be charged to zone 6 in amounts sufficient to react 0.5 mole of sulfide per mole of absorbed $SO_2$. Zone 6 is operated at a temperature of 150° F. and a pressure of approximately atmospheric. The amount of aqueous absorbent solution circulated to zone 6 via line 16 is selected to result in a volume ratio of input gas stream to absorbent solution of about 500:1. A treated gas stream containing substantially less $SO_2$ relative to the input gas stream is then withdrawn from zone 6 via line 7. Likewise, an effluent water stream containing ammonium thiosulfate and ammonium hydrosulfide is withdrawn from zone 6 via line 8 commingled with the effluent stream from zone 2 at the junction of line 8 with line 4 and the resulting mixture passed via line 4 to reduction zone 9. The liquid effluent stream from zone 6 contains about 1 wt. percent sulfur as ammonium thiosulfate. In addition, it contains ammonium sulfate in an amount corresponding to less than 5% of the $SO_2$ absorbed in zone 6.

Reduction zone 9 is a conventional thermal reactor designed to effect intimate contact between the two liquid streams charged thereto. By conventional means zone 9 is maintained at a temperature of 200° C. and a pressure 650 p.s.i.g. In addition, the flow rates of the input streams to zone 9 are selected to provide a residence time of approximately 6 minutes. The amounts of ammonium hydrosulfide and ammonium thiosulfate charged to zone 9 are sufficient to provide a mole ratio of ammonium hydrosulfide to ammonium thiosulfate of 7.5:1. In addition, the pH of the mixture of the effluent stream entering zone 9 is approximately 10. An aqueous effluent stream is then withdrawn from zone 9 via line 10 and an analysis of it indicates that 13% of ammonium hydrosulfide charged to the zone is reacted therein and 100% of ammonium thiosulfate is reacted therein. In addition, the analysis indicates that 99.5% of the material converted in zone 9 is converted to ammonium polysulfide with less than 0.5% converted to undesired, intractable ammonium sulfate. The aqueous stream withdrawn from zone 9 therefore contains large amounts of ammonium polysulfide, unreacted ammonium hydrosulfide and the trace amount of ammonium sulfate.

The resulting ammonium polysulfide-containing effluent stream is withdrawn from zone 9 via line 10 and passed to decomposition zone 11. In zone 11, the ammonium polysulfide is decomposed to yield $H_2S$, elemental sulfur and a regenerated absorbent solution. Preferably zone 11 is a distillation zone which is operated at a bottom temperature of 140° C. and a pressure of about 40 p.s.i.g. to produce an overhead stream containing $H_2S$, $H_2O$ and a minor amount of $NH_3$, a side stream comprising regenerated aqueous absorbent solution containing substantial amounts of ammonium hydroxide and relatively small amounts of ammonium hydrosulfide and a bottoms stream comprising elemental sulfur. Generally, this decomposition can be conveniently effected by taking 20 to 30 vol. percent of the feed stream entering zone 11 via line 10 overhead. In addition, it is necessary to maintain a relatively low temperature at the top of zone 11 in order to prevent substantial amounts of $NH_3$ from being carried over. This is conveniently accomplished by injecting a relatively cool water stream, such as a portion of the aqueous side stream from zone 11, into the top of zone 11 in order to scrub $NH_3$ out of the overhead vapor stream. The bottom sulfur stream from zone 11 is withdrawn therefrom via line 12 and constitutes the principal product of the present process. The side stream containing the regenerated aqueous absorbent solution is withdrawn from zone 11 via line 14, and in some cases a portion of it is withdrawn from the system via line 15, in order to remove the product water therefrom. However, as was explained hereinbefore, in most cases the input gas streams to the present system are not saturated with water; consequently, water is lost from the system in the gas streams and does not build up in this regenerated absorbent solution. Thus, in many cases make-up water must be added to the process via line 15. In either case the regenerated absorbent solution is passed via line 14 to the junction of line 14 with line 16 where it is divided into two parts, a first portion being charged to zone 2 via line 14 and a second portion being charged to zone 6 via line 16 as was previously explained. In some cases alkaline reagent is lost from the system in the scrubbing zone and additional make-up ammonia is added to the system via line 15.

Returning to the overhead vapor stream produced in zone 11, it is withdrawn therefrom via line 13 and passed to line 1 where it is commingled with the input $H_2S$-containing gas stream as was previously explained. This overhead gas stream contains substantially all of the $H_2S$ which is produced when the polysulfide is decomposed. In addition, it contains substantial additions of water-vapor and a relatively small amount of ammonia. It is a particular advantage of the present invention that scrubbing zone 2 is used to scrub not only the input gas stream but also this overhead vapor stream.

The process as described is operated for a substantial period of time and it is found that the build-up of undesired ammonium sulfate compounds in the aqueous absorbent solution is quite small relative to that which would be observed in a similar type process where the $SO_2$-scrubbing step was run to just absorb $SO_2$ without an attempt to convert to thiosulfate in the scrubbing zone. In addition, about 95% of the sulfur reactants absorbed in zones 2 and 6 are converted to elemental sulfur.

It is intended to cover by the following claims all changes and modifications of the above disclosure of the present invention which would be self-evident to a man of ordinary skill in the gas-treating art.

I claim as my invention:

1. A process for simultaneously treating a first gas stream containing $H_2S$ and a second gas stream containing $SO_2$ in order to remove $SO_2$ and $H_2S$ from the respective streams and to produce elemental sulfur, said process comprising the steps of:
   (a) contacting the first gas stream with an aqueous absorbent solution containing an alkaline reagent at scrubbing conditions selected to result in a first treated gas stream containing a reduced amount of $H_2S$ and in an effluent water stream containing a water-soluble sulfide compound;
   (b) contacting the second gas stream with an aqueous absorbent solution containing an alkaline reagent and with a reducing agent selected from the group consisting of finely divided sulfur, a polysulfide compound, a water-soluble sulfide compound and mixtures thereof, at reaction conditions selected to result in a second treated gas stream containing a reduced amount of $SO_2$ and in an effluent water stream containing a water-soluble thiosulfate compound;

(c) subjecting a mixture of the effluent water streams from steps (a) and (b) to reduction conditions selected to result in an effluent stream containing a polysulfide compound;

(d) subjecting at least a portion of the effluent stream from step (c) to polysulfide decomposition conditions effective to form elemental sulfur, hydrogen sulfide and a regenerated absorbent solution;

(e) passing at least a portion of the resulting hydrogen sulfide to step (a); and (f) passing separate portions of the regenerated absorbent solution to steps (a) and (b).

2. A process as defined in claim 1 wherein the alkaline reagent contained in said absorbent solution is selected from the group consisting of the carbonate and hydroxide compounds of ammonia, the alkali metals and the alkaline earth metals.

3. A process as defined in claim 1 wherein the alkaline reagent contained in said absorbent solution is ammonium hydroxide or ammonium carbonate.

4. A process as defined in claim 1 wherein the reducing agent utilized in step (b) is a portion of the elemental sulfur formed in step (d).

5. A process as defined in claim 1 wherein the reducing agent utilized in step (b) is a portion of the effluent stream produced in step (c).

6. A process as defined in claim 1 wherein the reducing agent utilized in step (b) is a portion of the effluent water stream recovered from step (a).

7. A process as defined in claim 1 wherein the reducing agent utilized in step (b) is a portion of the hydrogen sulfide produced in step (d).

8. A process as defined in claim 1 wherein the reaction conditions utilized in step (b) include a temperature of about 20 to about 150° C. and a pressure sufficient to the aqueous absorbent solution in the liquid phase.

9. A process as defined in claim 1 wherein the reduction conditions utilized in step (c) include a temperature of about 100 to about 370° C. and a pressure sufficient to maintain the mixture of the effluent water streams in the liquid phase.

10. A process for simultaneously treating a first gas stream containing $H_2S$ and a second gas stream containing $SO_2$ in order to remove $H_2S$ and $SO_2$ from the respective streams and to produce elemental sulfur, said process comprising the steps of:

(a) contacting the first gas stream with an aqueous absorbent solution containing ammonium hydroxide at scrubbing conditions selected to result in a first treated gas stream containing a reduced amount of $H_2S$ and an effluent water stream containing ammonium hydrosulfide;

(b) contacting the second gas stream with an aqueous absorbent solution containing ammonium hydroxide and with a reducing agent at reaction conditions selected to result in a second treated gas stream containing a substantially reduced amount of $SO_2$ and an effluent water stream containing ammonium thiosulfate;

(c) subjecting a mixture of the effluent water stream from step (a) and the effluent water stream from step (b) to reduction conditions selected to result in an effluent stream containing ammonium polysulfide;

(d) subjecting at least a portion of the effluent stream from step (c) to polysulfide decomposition conditions effective to form elemental sulfur, hydrogen sulfide and a regenerated absorbent solution;

(e) passing at least a portion of the resulting hydrogen sulfide to step (a); and (f) passing separate portions of the regenerated absorbent solution to steps (a) and (b).

11. A method as defined in claim 10 wherein the reducing agent utilized in step (b) in a portion of the elemental sulfur recovered in step (d).

12. A process as defined in claim 10 wherein the reducing agent utilized in step (b) is a portion of the ammonium polysulfide-containing effluent stream produced in step (c).

13. A process as defined in claim 1 wherein the reducing agent utilized in step (b) is a portion of the ammonium hydrosulfide-containing effluent stream formed in step (a).

14. A process in claim 10 wherein the reducing agent utilized in step (b) is a portion of the hydrogen sulfide produced in step (d).

References Cited
UNITED STATES PATENTS

| | | | |
|---|---|---|---|
| 2,863,732 | 12/1958 | Bowers et al. | 23—224 |
| 1,079,291 | 11/1913 | Feld | 23—225 |
| 3,561,925 | 2/1971 | Deschamps et al. | 23—226 |
| 3,536,618 | 10/1970 | Urban et al. | 23—224 X |
| 1,011,043 | 12/1911 | Feld | 23—225 X |
| 2,052,892 | 9/1936 | Murray. | |

FOREIGN PATENTS

| | | | |
|---|---|---|---|
| 947,640 | 1/1964 | Great Britain | 23—225 R |

OTHER REFERENCES

Mellor, J. W.: A Comprehensive Treatise on Inorganic and Theoretical Chemistry; vol. X, Longmans, Green and Co., London 1930, pp. 516–19.

OSCAR R. VERTIZ, Primary Examiner

G. O. PETERS, Assistant Examiner